United States Patent [19]

Drukarey et al.

[11] Patent Number: 5,105,814
[45] Date of Patent: Apr. 21, 1992

[54] METHOD OF TRANSFORMING A MULTI-BEAM ULTRASONIC IMAGE

[75] Inventors: Alexander I. Drukarev, San Carlos; Konstantinos Konstantinides, San Jose; Gadiel Seroussi, Cupertino, all of Calif.

[73] Assignee: Hewlett-Packard Company, Palo Alto, Calif.

[21] Appl. No.: 568,455

[22] Filed: Aug. 15, 1990

[51] Int. Cl.$^5$ .............................................. A61B 8/00
[52] U.S. Cl. ........................ 128/660.07; 128/660.01; 128/661.01; 73/626
[58] Field of Search ...................... 128/660.07, 660.01, 128/661.01; 73/625, 626, 602

[56] References Cited

U.S. PATENT DOCUMENTS

| | | | |
|---|---|---|---|
| 4,841,491 | 6/1989 | Kondo et al. | 128/661.01 |
| 4,866,614 | 9/1989 | Tam | 128/660.07 |
| 4,873,869 | 10/1989 | Fink | 128/660.07 |
| 5,000,183 | 3/1991 | Bonnefous | 128/660.01 |
| 5,027,820 | 7/1991 | Pesque | 128/660.07 |

OTHER PUBLICATIONS

Gilbert B. Devey and Peter N. T. Wells, "Ultrasound in Medical Diagnosis", Scientific American, vol. 238, No. 5, Mar. 1978, pp. 98–112.
James F. Havlice and Jon C. Taenzer, "Medical Ultrasonic Imaging: An Overview of Principles and Instrumentation", Proceedings of the IEEE, vol. 67, Apr. 1979, pp. 620–641.
H. Edward Karrer and Arthur M. Dickey, "Ultrasound Imaging: An Overview", Hewlett Packard Journal, Oct. 1982, pp. 3–6.
Ronald D. Gatzke et al., "Electronic Scanner for a Phased-Array Ultrasound Transducer", Hewlett-Packard Journal, Dec. 1983, pp. 13–20.
Hugh A. McCann et al., "Multidimensional Ultrasonic Imaging for Cardiology", Proceedings of the IEEE, vol. 76, No. 9, Sep. 1988, pp. 1063–1073.
John Poulton et al., "Integrated Circuits for 3-D Medical Ultrasound Imaging", MCNC Technical Bulletin, Jul./Aug., pp. 6–7.
Matthew O'Donnell, "Applications of VLSI Circuits to Medical Imaging", Proceedings of the IEEE, vol. 76, No. 9, Sep. 1988, pp. 1106–1114.
Jesse Butler and Ralph Lowe, "Beam-Forming Matrix Simplifies Design of Electronically Scanned Antennas", Electronic Design, Apr. 12, 1961, pp. 170–173.
M. O'Donnell and S. W. Flax, "Phase Aberration Measurements in Medical Ultrasound: Human Studies", Ultrasound Imaging 10, 1–11, 1988, pp. 1–11.
Ayhan M. Vural, "An Overview of Adaptive Processing for Sonar Applications", IEEE Electronics and Aerospace Systems Convention, 1975, pp. 34A–34M.
B. B. Lee and E. S. Furgason, "Pseudo-Random Codes for Single-Mode and Simultaneous Multi-Mode Operation in Ultrasonic Imaging Systems", Purdue University, May 1985, pp. 9–11.
Barry D. Van Veen and Kevin M. Buckley, "Beamforming: A Versatile Approach to Spatial Filtering", IEEE ASSP Magazine, Apr. 1988, p. 4–24.

*Primary Examiner*—Frank S. Jaworski
*Assistant Examiner*—George Manuel

[57] ABSTRACT

A method of transforming a multi-beam ultrasonic image in which a plurality of ultrasonic beams are simultaneously transmitted into an object along a plurality of lines and across a plurality of arcs. The reflected signals are sensed along each line and sampled thereby creating an image matrix of sampled values taken from the intersection of each line and arc. For each image value, a linear combination of surrounding values is formed to create a transformed image value which reduces the effect of interbeam interference.

18 Claims, 5 Drawing Sheets

METHOD OF TRANSFORMING A MULTI-BEAM ULTRASONIC IMAGE

BACKGROUND OF THE INVENTION

1. Field of the Invention

The present invention relates to ultrasonic imaging, such as ultrasound imaging, and more particularly to such imaging which scans an object with multiple ultrasonic beams which are simultaneously transmitted.

2. Background of the Invention

During the last two decades, advances in signal processing and electronics have helped ultrasound imaging to become one of the major tools in non-invasive clinical diagnosis. By transmitting a series of high frequency pulses, ultrasound imaging allows the examination of internal organs with far less risk than conventional surgical techniques or X-rays. Ultrasound imaging is used in measuring the performance of the heart, the flow of blood, to identify tumors, and in prenatal care and diagnosis.

Figure 1:
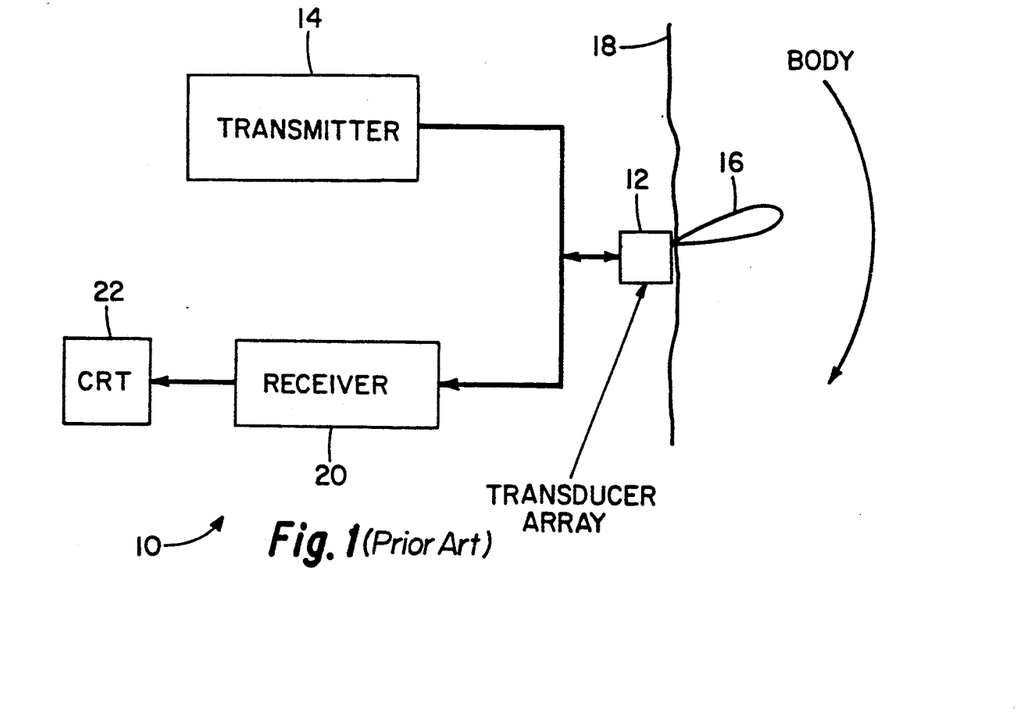
FIG. 1 is a schematic diagram of a prior art single-beam ultrasonic imaging system.

A simplified block diagram of a typical prior art ultrasound imaging system is indicated generally at 10 in FIG. 1. A piezoelectric transducer array 12, comprising a stationary array of many small transducers, is stimulated by a high frequency transmitter circuit 14. When array 12 is so stimulated, it generates an ultrasonic pulse in a relatively narrow beam 16, such being illustrated schematically. In FIG. 1, transducer array 12 is substantially flush against and aimed into an object 18 which, in the case of medical ultrasound imaging, comprises a human body.

After transmission of beam 16, the reflections of the pulse from body 18 are detected by array 12 with such signals being processed by a receiver 20 for display on a cathode ray tube 22.

A two-dimensional image can be obtained by sweeping a beam, like beam 16, through a sector. For example, in a phased-array ultrasound system such as system 10, stationary array 12 is electronically controlled to steer and focus such a beam. Such an array is illustrated in R. D. Gatzke, J. T. Fearnside, and S. M. Karp, "Electronic Scanner for a Phased-Array Ultrasound Transducer," Hewlett-Packard Journal, pp. 13–20, Dec. 1983, which is incorporated herein by reference.

Current pulse echo imaging systems gather data sequentially. In a phased-array imaging system, like system 10, a pulse is transmitted in a narrow beam with the focus optimized for one line. Using dynamic receive focusing, the pulse is traced as it travels through the body. This process is repeated for each line until a complete image, 100–200 lines, is acquired. The transmission rate is selected so that echos of the transmitted pulse have time to return from the deepest target before the next pulse is transmitted.

Real-time systems must image all points at a rate of at least 30 frames per second. If T denotes the transmission period, then for a typical depth of image of 20 cm, a speed of sound of 1450 m/sec, and a CRT frame rate of 30 frames/sec, the best available line resolution is $$\text{Resolution} = \frac{\text{frame time}}{T} = \frac{1/30 \text{ sec}}{2 \cdot \frac{0.2 \text{ m}}{1450 \text{ m/s}}} = 120 \text{ lines/frame} \quad (1.1)$$

From (1.1), the major limitation in resolution and acquisition rates is the speed of sound in the body. This limitation leads to compromises in the design of present equipment, and limits the capabilities of future ultrasonic scanners.

A recent development of great interest is three-dimensional (3-D) acoustical imaging, where a stacked set of 2-D scans yields a 3-D image of an internal organ. A three-dimensional array is described in H. A. McCann et al., "Multidimensional Ultrasonic Imaging for Cardiology," Proc. of the IEEE, Vol. 76, No. 9, Sep. 1988, which is incorporated herein by reference. For example, such a technique could allow a non-invasive view of the heart arteries for the efficient diagnosis of heart diseases. However, current techniques and acquisition rates make impossible the implementation of a 3-D imaging system operating in real time.

One approach to overcome this problem is to apply massively parallel processing in the circuitry that forms the received echoes. Such a scheme is disclosed in J. Poulton, 0. Von Ramm, and S. Smith, "Integrated circuits for 3-D Medical Ultrasound Imaging," MCNC Technical Bulletin, Vol. 3, No. 4, Jul./Aug. 1987, which is incorporated herein by reference. For each transmitting beam, which illuminates many points simultaneously, 64 simultaneous receiving beams are formed over an $8 \times 8$ line grid. Parallel processing then can be applied for the simultaneous processing of all received signals. Such simultaneous parallel processing is disclosed in M. O'Donnell, "Applications of VLSI Circuits to Medical Imaging," Proc. of the IEEE, Vol. 76, No. 9, pp. 1106–1114, Sep. 1988, which is incorporated herein by reference.

Figure 2:
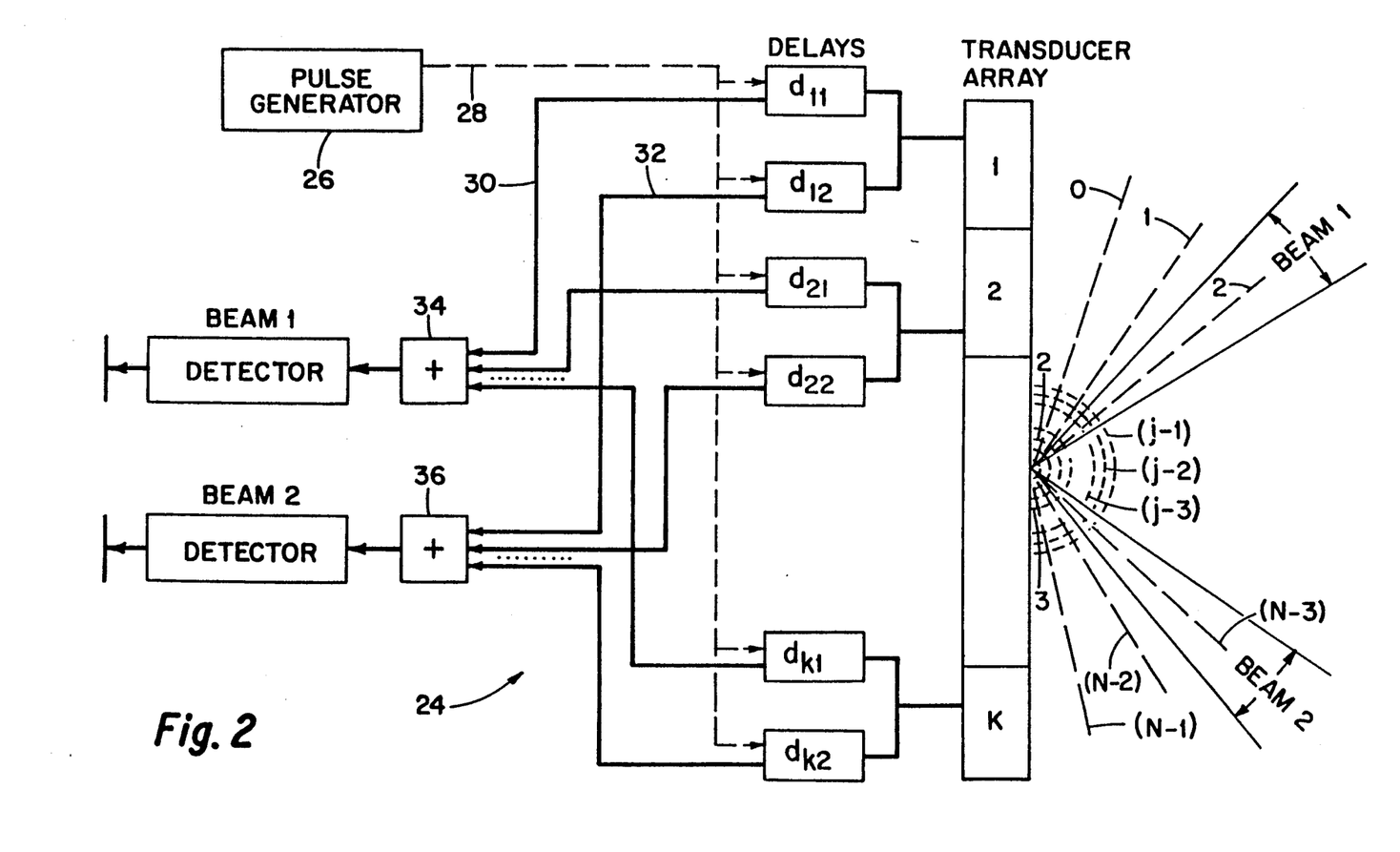
FIG. 2 is a schematic diagram of a multi-beam, ultrasonic imaging system utilized in implementing the present invention.

Turning now to FIG. 2, indicated generally at 24 is a two-beam ultrasound system for creating an image in a single plane. Included therein are a total of K transducer elements, three of which are labeled elements 1, 2, K. Each element is associated with two time delays, $d_{11}$ through $d_{K2}$, where transducer element 1 is connected to delays $d_{11}$, $d_{12}$; transducer element 2 is connected to delays $d_{21}$, $d_{22}$; and transducer element K is connected to delays $d_{K2}$, $d_{K2}$.

A commercially available pulse generator 26 is connected to each of the delays via conductor 28. When pulse generator 26 produces a pulse on conductor 28 it is applied to each of the delays. After a predetermined time delay, the pulse is applied to the transducer to which each delay is connected. The transducer elements generate an ultrasonic pulse which propagates into an object against which the transducer array is held.

The length of the delay imposed on a pulse applied thereto for each of time delays $d_{11}$ through $d_{K2}$ is variable and is controlled by a computer in a known manner. Through such computer control, a preselected number of ultrasonic beams are caused to propagate from the center of the array with each beam having a preselected angle thereto. Appropriate choices of the delay settings are used to select both the angle and focus length of a transmitted beam.

Reception of beam reflections operates in a reverse manner. When an ultrasonic reflection strikes one of transducer elements 1-K, the element generates an electrical signal proportional to the ultrasonic reflection which is applied to the time delays. This delays each signal by a preselected value in the same fashion as the transmitted pulse is delayed. Each of the delayed received signals is applied to a conductor, like the signal from delay $d_{11}$ is applied to conductor 30 and the signal from delay $d_{12}$ is applied to conductor 32. The signals from one of the delays associated with each transducer element are summed by a conventional summing device 34 with the signals from the other time delay associated with each transducer element being summed at a separate summing device 36.

Selection of the reception angle and focus is accomplished in the same manner as selection of transmission angle and focus, i.e., by setting different time delays in a known manner. The array is thus caused to focus along each transmission axis at progressively increasing distances thereby sensing the ultrasonic reflections generated by each transmitted pulse.

System 24 comprises a 2-beam system, i.e., two ultrasonic pulses are simultaneously transmitted into the object. The time delays associated with summing device 34 are used to control the angle and focusing of one of the beams in the reception mode while the delays connected to summing device 36 are used to so control the other beam. This approach is a direct extension of the single-beam system described in R. D. Gatzke, J. T. Fearnside, and S. M. Karp, "Electronic Scanner for a Phased-Array Ultrasound Transducer," Hewlett-Packard Journal, pp. 13-20, Dec. 1983, and in its general form requires K×M delay elements for a system having M beams and K transducer elements. It should be appreciated that alternative beam-forming techniques which require a reduced number of delay elements could be equally well used to provide a multi-beam ultrasound imaging system. For example see J. Butler, R. Lowe, "Beam-Forming Matrix Simplifies Design of Electronically Scanned Arrays," Electronic Design, pp. 170-173, Apr. 12, 1961.

Figure 3:
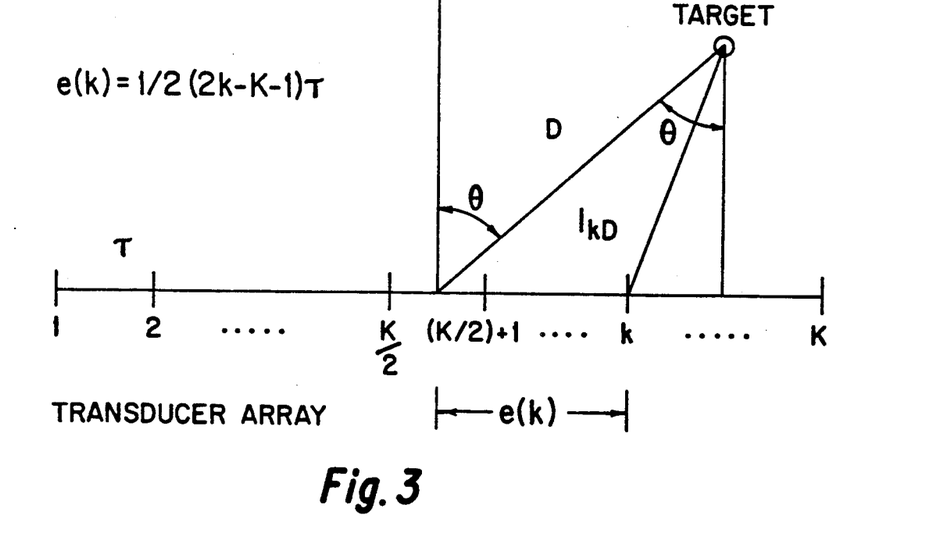
FIG. 3 is a schematic diagram of a K element ultrasound transducer array.

Consideration will now be given to the problem of interbeam interference which arises with a multi-beam ultrasonic system such as that depicted in FIG. 2. Assume the system has M beams and a transducer array of K elements. Suppose that only beam j is active and there is a single target at distance D and angle $\Theta$ from the array (FIG. 3). Assuming the media is free of frequency distortion and attenuation, the value of the ultrasound signal that illuminates the target is then given by $$T_j^s(t) = \sum_{k=1}^{K} g(t - d_{kj} - \delta_{kD}), \qquad (2.1)$$

where $d_{kj}$ is the delay required at the input of the k-th element for the electronic focusing of beam j (see FIG. 2), $\delta_{kD}$ is the time required for the signal generated by element k to reach the target, and G(t) is the signal generated by the pulse generator. The superscript s denotes that the system is in single-beam mode.

From FIG. 3, $\delta_{kD} = l_{kD}/V$ where V is the speed of sound and $l_{kD}$ is the distance of element k from the target. By applying the Pythagorean theorem, it can be shown that $$\delta_{kD} = \frac{1}{V} \sqrt{D^2 + e(k)^2 - 2e(k)D \sin\theta}, \qquad (2.2)$$

where $e(k) = \frac{1}{2}(2k-K-1)$, is the distance of element k from the center of the array and $\tau$ is the distance between the elements of the transducer. For beam focusing at a distance $D_{fj}$, it is required that $d_{kj} + \delta_{kDfj} =$ constant $= T_f$. Then from (2.2):

$$d_{kj} = T_f - \frac{1}{V} \sqrt{D_{fj}^2 + e(k)^2 - 2e(k)D_{fj} \sin\theta_j}, \qquad (2.3)$$

where $D_{fj}$ is the focusing distance of beam j, $\Theta_j$ is the steering angle of beam j, and $T_f$ is a constant selected so that $d_{kj}$ is always positive.

Similarly to (2.1), the received echo from beam j is given by $$R_j^s(t) = \alpha \sum_{n=1}^{K} T_j^s(t - d_{nj} - \delta_{nD}) = \qquad (2.4)$$

$$\alpha \sum_n \sum_k g(t - d_{nj} - \delta_{nD} - d_{kj} - \delta_{kD}),$$

where $\alpha$ denotes the target reflectivity.

When all M beams are transmitted at the same time, if $T^m(t)$ denotes the composite signal that illuminates the target in the multi-beam mode, then:

$$T^m(t) = \sum_{b=1}^{M} T_b^s(t) = \sum_{b=1}^{M} \sum_{k=1}^{K} g(t - d_{kb} - \delta_{kD}). \qquad (2.5)$$

From (2.4) and (2.5), the received signal at the output of the receiver for the j-th beam is given by $$R_j^m(t) = \alpha \sum_{n=1}^{K} T^m(t - d_{nj} - \delta_{nD}) = \alpha \sum_n \sum_b T_b^s(t - d_{nj} - \delta_{nD}). \qquad (2.6)$$

From (2.1)–(2.6) it can be shown that:

$$R_j^m(t) = R_j^s(t) + \alpha \sum_{b \neq j} \sum_n \sum_k g(t - d_{kb} - \delta_{kD} - d_{nj} - \delta_{nD}). \qquad (2.7)$$

The second term in (2.7) implies that the signal received from an image target through some beam j will be affected by the transmitted energy of all other beams. This term is referred to herein as interbeam interference and is mainly due to the sidelobe energy of each beam. The interference occurs in two dimensions, namely along each arc which crosses the beams and along the axis of each beam. In a real imaging system, this interference is seen as a "butterfly pattern" around the true target.

Although prior art systems have processed data collected by multiple beam (and single-beam) ultrasonic imaging systems, they have either a very high degree of complexity or do not minimize the effect of interbeam interference to the extent that the present invention does.

SUMMARY OF THE INVENTION

The present invention provides a method for imaging an object using an array of sonar transmitters. The array simultaneously transmits a plurality of ultrasonic beams into an object along a plurality of lines and across a plurality of arcs. The ultrasonic signal reflected along each of said lines is sensed and an image array comprised of said reflected signals is created. Each value in the array represents a signal reflected from one of said arcs. For a selected value in the image array, a transformed image value is created which is a function of values in the signals reflected along the simultaneously transmitted beams on both sides of the arc containing the selected element.

In another aspect of the invention, the foregoing is accomplished for each element in the image array thereby creating an array of transformed image values which minimizes the effect of interbeam interference.

It is a general object of the present invention to provide a method of transforming a multi-beam ultrasonic image which is an improvement over prior art methods.

It is a more specific object of the present invention to increase the data acquisition rate while maintaining the accuracy of the data at a high level.

It is a more specific object of the present invention to provide such a method which minimizes the effect of interbeam interference.

It is another specific object of the present invention to provide such a method which minimizes interbeam interference in both dimensions of the image plane.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 4A:
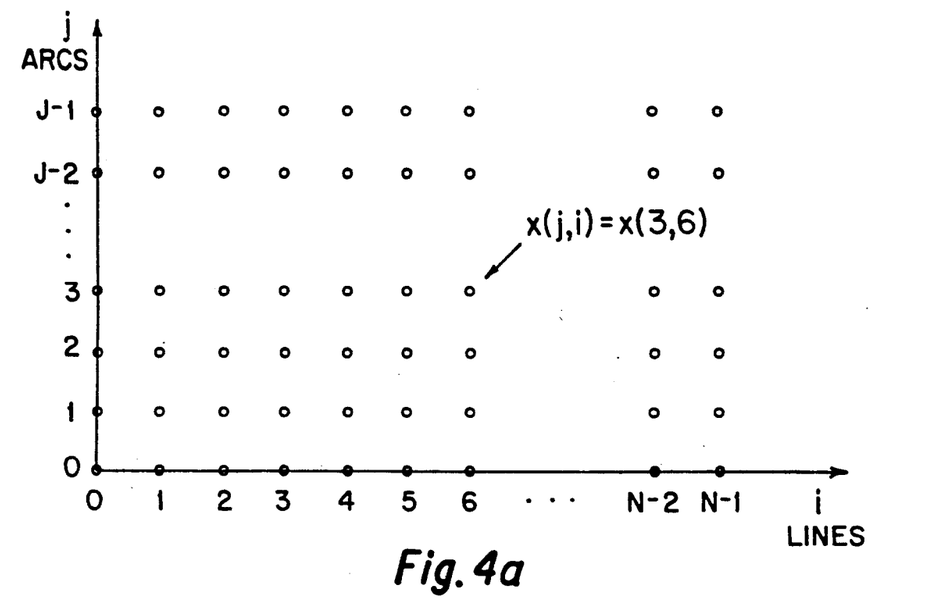
FIG. 4A is a diagram of the position of a number of values sampled in a single-beam ultrasound image field.

Consideration will now be given to the basic notation used in the equations which describe the transformation method of the present invention. Turning now to FIG. 4A, illustrated therein are the image field positions of values sampled by a single-beam system. Each point in the field is characterized by a pair of indices (j,i) where $j=0,1,\ldots,J-1$ is the arc number and $i=0,1,\ldots,N-1$ is the line number. It is assumed that the transducer is located below arc 0. In reality, a scanned image field is a sector, like that shown in FIG. 2. In FIG. 2, several of the lines are numbered to correspond to the line numbers in FIG. 4B as are the arcs. In the view of FIG. 2, beam 1 is coaxial with line two and beam three is coaxial with line $N-3$.

The transducer in the FIG. 2 system sends several beams simultaneously into the image field. These simultaneously transmitted beams are referred to as the beam array. The beam array consists of M beams and the beams are numbered from the left as follows: $m=0,1,\ldots,M-1$. For the system of FIG. 2, $M=2$. It is assumed that the focusing distances are the same for all beams in the array and the beams are separated by $\Delta$ lines or $\Delta_{deg}$ degrees. Note that the beam separation and the line (or angular) resolution of a multi-beam system are independent quantities. For example, one can have a beam array with a 5 degree beam separation but rotate it only 0.5 degrees at a time thus achieving a 0.5 degree line resolution. The beam array of FIG. 2 has a beam separation of around 60 degrees. It should be noted, however, that such a large beam separation is not typical and that FIG. 2 is so drawn only to illustrate the notation used herein. As the beam array scans the image field each position of the beam array is characterized by a pair of numbers (j,p) where j is the receive focusing arc number and p is the line position of the array. We adopt the convention where the line positions of the array are numbered consecutively from the left as follows: $p=0,1,\ldots,P-1$, where $P=N/M$. Unlike in a 1-beam system, the number of lines in a multi-beam system cannot be arbitrary. In order not to have "holes" in a scanned sector and not to visit the same line twice the number of lines must be a multiple of $\Delta \cdot M$.

The beam array scans the image field as follows. Assume that at the beginning the beam array is in position (0,0) and the separation between beams is $\Delta$. Transmit on all beams and receive the reflections from all arcs. Move the array one line to the right and transmit again. Continue until the line number of beam 0 is the same as the initial line number of beam I. (This means that beam 0 is about to scan a line that has already been scanned.) Then jump to a new position such that the line position of beam 0 will be just to the right of the last line position of the beam $M-1$, and continue as described above. We will refer to this scanning format as the scan and jump format.

Figure 4B:
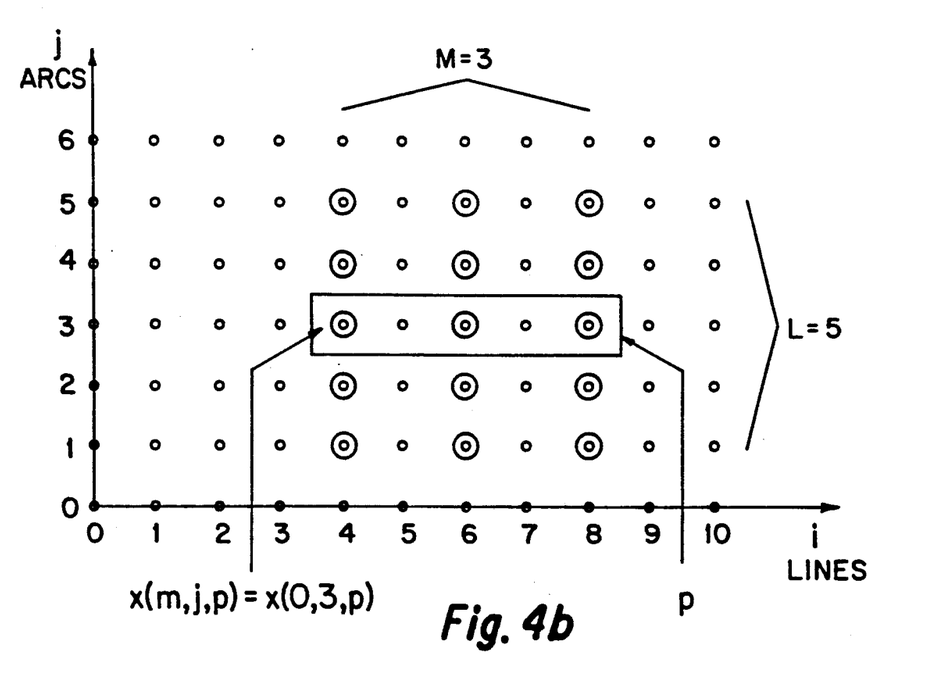
FIG. 4B is a diagram of the position of a number of values sampled in a multi-beam ultrasound image field in accordance with the present invention.

With reference to FIGS. 2 and 4B, it can be seen that each pulse transmitted along a line reflects a signal which contains information about the media through which the signal passes. The reflected signal is periodically sampled to produce a plurality of sampled values for each such signal. Each value can be keyed to a location in the image field, as illustrated in FIG. 4B. The sampled values illustrated in FIG. 4B are referred to herein as an image array or matrix with each sampled value, x(j,i) comprising an element in the matrix. Although the transformation method can be applied to both continuous and sampled signals, in this embodiment it is assumed that the sensed signals are sampled.

Generally speaking, the principle of the present invention is explained as follows. In a multiple-beam system the presence of several beams transmitting simultaneously causes a two-dimensional interference pattern around a point target as described above. This implies that a signal received from an imaged target through some beam m will be affected by the signals reflected by other targets in the vicinity of the imaged target and such is demonstrated by Equation 2.7. These reflections are received by the beam array, hence the received signals carry information regarding the amount of interbeam interference. The interference can be eliminated if we take the "interference portions" of the received signals and subtract them from the signal received from the imaged target. Unfortunately, the "interfering portions" are not known in advance. So, instead we form a linear combination of the sampled values in the vicinity of the imaged target (including the value of the signal received from the imaged target itself) and use it instead of the imaged target signal. Such sampled values from the vicinity of the imaged target include values on adjacent lines and arcs relative to the imaged target. The coefficients in this linear combination are computed in such a way that the interbeam interference is minimized. These coefficients are referred to as the transformation coefficients or the transformation kernel.

The transformation just described can be performed either in the RF domain or in the video domain (i.e., after detection). The image matrix so transformed is referred to herein as a matrix of transformed image values. Transformation after detection is easier to implement and that is why this transformation mode was chosen to implement the present embodiment of the invention. The transformation method and the procedure for finding the optimum transformation coefficients is described now in a more detailed fashion.

It should be noted that the present invention is preferably implemented with more than two beams. The 2-beam system of FIG. 2 is used to simplify the description of the preferred embodiment. The beam configuration can be arbitrary. The transformation method of the present invention can be applied regardless of beam array orientation.

In the current 1-beam systems the brightness distribution over the image field can be described by a two-dimensional quantity $x(j,i)$ which represents the received value (after detection) from the point $(j,i)$. In a multi-beam system using the scan and jump format described above, different points are imaged by different beams. In order to preserve the beam identity of each point the above notation has to be changed to $x(m,j,p)$ which is the value (after detection) received through the beam $m$ from the arc $j$ when the beam array is in the position $p$ along that arc. The value $x(m,j,p)$ is called a composite value since it represents a combination of reflected values from pulses transmitted through all the beams.

Consider the beam array in some position $(j,p)$, the rectangle bounded by solid lines in FIG. 4B. Consider also an L by M array of composite signals corresponding to L consecutive arc positions of the beam array and centered around the current position $(j,p)$. This array is shown as the circled points in FIG. 4B and is referred to herein as a window. The quantity L is specified later. The array of composite values just described is referred to as a composite set and it is this set that is used to form a linear combination in the transformation equation.

It is important to remember that for a given arc a composite set includes the M signals received by the beams in a given angular position of the beam array rather than the signals corresponding to M consecutive points of the arc (they will be the same only if the beam separation is equal to one line). The set is constructed that way because a received signal will be affected only by the signals transmitted by other beams at the same time i.e., in the same position of the beam array, rather than by the signals corresponding to the adjacent points on the arc.

Denote by $\lfloor L_0 = L/2 \rfloor$ (the largest integer not exceeding $L/2$) the row number corresponding to the position of the beam array within a composite set. Then the elements of the l-th row of the composite set can be written as $x(m, j - L_0 + l, p)$ where $m = 0, 1, \ldots, M-1$ and $l = 0, 1, \ldots, L-1$. Note that the point $(m=0, l-0)$ corresponds to the lower left hand corner of a composite set.

In the present embodiment of the invention, the composite values are converted into the values signals $y(m,j,p)$ according to the following equation:

$$y(m,j,p) = \sum_{l=0}^{L-1} \sum_{b=0}^{M-1} c(m,l,b)x(b, j - L_0 + l, p) \quad (3.1)$$

$m = 0, 1, \ldots, M - 1;$
$j = L_0, L_0 + 1, \ldots, J - L + L_0;$
$p = 0, 1, \ldots, P - 1.$ where the three-dimensional array $\{c(m,l,b)\}$ is the array of transformation coefficients. This array of transformation coefficients is referred to as the transformation kernel of width M depth L and height M. A good way to visualize the transformation process described by (3.1) is to think of it as a process of taking a 2-D array of composite values "covered" by the transformation kernel and replacing the elements of the middle row of the array by a linear combination of the elements in the array. Note that due to the depth of the kernel the number of arcs in the transformed image $J_A$ is less than that in the original image, namely $J_A = J - L + 1$.

The transformation coefficients are the key component of the transformation equation (3.1). They can be determined to minimize interbeam interference. Mathematically, this condition can be stated as follows. Let $d(m,j,p)$ be the desired value of $y(m,j,p)$, i.e. the value without the interbeam interference. Then the c coefficients can be found by minimizing the RMS error between the transformed and the desired signals, over the entire image field, i.e.:

$$\sum_{j=L_0}^{J-L+L_0} \sum_{p=0}^{P-1} [y(m,j,p) - d(m,j,p)]^2 = \sum_{j=L_0}^{J-L+L_0} \sum_{p=0}^{P-1} \left[ \sum_{l=0}^{L-1} \sum_{b=0}^{M-1} c(m,l,b)x(b,j - L_0 + l, p) - d(m,j,p) \right]^2 = \min, \quad (3.2)$$

$m = 0, 1, \ldots, M - 1.$

Note that the minimization is done independently for each m.

What should the desired signal $d(.)$ look like? Obviously, it will depend on the picture being imaged. In the current 1-beam systems there is a special type of "test" picture and the corresponding system output which is used to characterize the performance of the system, namely the point spread function, or the beam profile. We used a similar approach for a multiple beam system. The "test", or "training", picture, referred to herein as a training-object, for finding the transformation coefficients comprises a single point target located at the transmit focusing distance of the beam array (the central arc of the image field $j_c = \lfloor J/2 \rfloor$) and in the middle of the central arc $i_c = \lfloor I/2 \rfloor$). The matrix of sampled image values collected from a scan of the training-object is referred to herein as a matrix of training-object sampled values. The desired signal for each beam m scanning such a training-object is a delta function equal to one when the beam looks right at the target and zero elsewhere. Other desired signals might also be used, such as an actual signal from a single-beam scan of the training-object. Such a desired signal is referred to herein as an ideal training-object matrix.

The optimizing equation (3.2) can be thought of as a "training equation" because it tells us how we can corresponding desired response to produce an optimum set of the transformation coefficients. In writing this equation it was assumed that the composite and the desired signals had been obtained using the "scan and jump" scanning format described above. However, if the desired function is a delta function that scanning format will not produce a meaningful set of transformation coefficients. In the "scan and jump" approach only one beam will ever see the test target. Hence, the desired functions for all other beams in the array will be identically zero. Then the solution to the RMS problem will be satisfied by a set of transformation coefficients that are all zero and of no practical use.

In addition to this fundamental limitation, using the "scan and jump" format for training has one other practical drawback. In a real image, the objects can have arbitrary angular orientations with respect to each beam in the array. So, to produce a roust set of the transformation coefficients we would like to have a training procedure that includes as many different orientations of a test target with respect to each beam in the array as possible. The "scan and jump" scanning algorithm does allow each beam to visit all the arcs in the image field, however, only a limited number of lines can be visited.

In order to overcome the limitations discussed above, the scan algorithm is modified so that the beam array always rotates only one line at a time in the training mode. That is, for a given angular position of the beam array we scan all the arcs from 0 to $J-1$ and then move the array one line to the right so that beam 0 now faces the same direction as beam 1 in the previous angular position, beam 1 faces the same position as beam 2, etc. We refer to this scanning mode as the training mode as opposite to the imaging mode which uses the "scan and jump" format. The composite, transformed and desired signals for the training mode are denoted as $X_T(m,j,p), Y_T(m,j,p)$ and $d_T(m,j,p)$, respectively. The same quantities without the subscript T refers to the imaging mode. The number of beam array positions per arc in the training mode is $P_t = N - (M-1)\Delta$. The optimization equation (3.2) is rewritten now in the following form:

$$\sum_{j=L_0}^{J-L+L_0} \sum_{p=0}^{P_T-1} \left[ \sum_{l=0}^{L-1} \sum_{b=0}^{M-1} c(m,l,b) x_T(b,j - L_0 + l,p) - d_T(m,j,p) \right]^2 = \min, \quad (3.3)$$

$m = 0, 1, \ldots, M - 1.$

Equation (3.3) is actually M independent equations. In order to find the optimum transformation coefficients we differentiate each of the equations with respect to the ML unknowns $c(m,l,b)$, equate the derivatives to zero and solve for the unknowns. Differentiating (3.3) with respect to some coefficient $c(m,l_s,b_q)$ and rearranging the terms yields the following expression:

$$\sum_{l=0}^{L-1} \sum_{b=0}^{M-1} c(m,l,b) r(b,l,b_q,l_s) - v(m,b_q,l_s) = 0, \quad (3.4)$$

where $$r(b,l,b_q,l_s) = \quad (3.5)$$

$$\sum_{j=L_0}^{J-L+L_0} \sum_{p=0}^{P_T-1} x_T(b,j - L_0 + l,p) x_T(b_q,j - L_0 + l_s,p),$$

-continued $$v(m,b_q,l_s) = \quad (3.6)$$

$$\sum_{j=L_0}^{J-L+L_0} \sum_{p=0}^{P_T-1} d_T(m,j,p) x_T(b_q,j - L_0 + l_s,p),$$

$m = 0, 1, \ldots, M - 1, \quad b_q = 0, 1, \ldots, M - 1,$
$l_s = 0, 1, \ldots, L - 1.$ The solution of (3.4) can be written in a closed form if we introduce a matrix notation. In this notation lower case letters denote matrix elements and upper case letters denote the corresponding matrices. In odder to express (3.4) in a matrix form we have to reduce the dimensionality of the quantities involved. This reduction is performed as follows. An $L \times M$ composite set is expressed as an equivalent vector of length ML by numbering the elements of the set consecutively, row by row. The 3-D transformation kernel is converted into an equivalent 2-D array, where the m-th row of the equivalent array corresponds to the m-th plane of the 3-D kernel. As a result of these transformations, the indices and the quantities involved in (3.4) are expressed as the equivalent 2-D quantities as follows:

$$n = lM + b, \quad k = l_s M + b_q \quad (3.7)$$

$$c_E(m,n) = c(m,l,b), \quad (3.8)$$

$$r_E(n,k) = r(b,l,b_q,l_s), \quad (3.9)$$

$$v_E(m,k) = v(m,b_q,l_s), \quad (3.10)$$

Using the equivalent quantities equation (3.4) is rewritten as follows:

$$\sum_{n=0}^{ML-1} c_E(m,n) r_E(n,k) - v_E(m,k) = 0, \quad (3.11)$$

$m = 0, 1, \ldots, M - 1 \quad k = 0, 1, \ldots, ML - 1$

The matrices of the equivalent quantities are $C_E = \{c_E(m,n)\}$, $R_E = \{r_E(n,k)\}$ and $V_E = \{v_E(m,k)\}$. Now equation (3.11) is written in a matrix form as $C_E \cdot R_E = V_E$ and the solution of this matrix equation is:

$$C_E = V_E(R^{-1}_E) \quad (3.12)$$

Note that (3.12) represents the standard solution of a least squares problem where $R_E$ is a correlation matrix of the input quantities (the composite signals in our case), and $V_E$ is a cross-correlation matrix of the input and the desired quantities.

It should be noted that the data collected by the multi-beam scanning system of FIG. 2 is provided to a special purpose computer (not shown) which is programmed to transform the data in accordance with the equations disclosed herein. A person having ordinary skill in the art can program a computer to perform the various operations indicated by the equations herein to apply the method of the present invention.

To evaluate the effectiveness of the beam transformation method described above, and to determine optimal values for the parameters of the system, a time domain simulator of the multi-beam ultrasonic imaging system was developed. The simulator produces images for arbitrary target distributions for single-beam, multi-beam, and multi-beam transformed systems, allowing for a wide range of experimentation in the main system parameters such as number of beams, beam separation, size and resolution of the imaging field, number of phased array elements, etc.

Experiments were conducted using the time domain simulator, testing various system parameters and configurations. Following are results of a small but typical subset of such simulations, in graphical form. In the simulations reported below, the following system parameters are fixed:

| | |
|---:|:---|
| Line separation = | 1 degree, |
| Beam separation = | 1 line, |
| Number of arcs = | 51, |
| Arc separation = | 1.23 mm, |
| Transmit focus distance = | 100 mm, |
| Field depth = | 69.2 mm to 130.8 mm |
| Lines in transformation kernel = | 11, |
| Elements in phased array = | 128, |
| Carrier frequency = | 2.5 MHz. |

The following considerations apply in selecting an appropriate number of lines in the transformation kernel (i.e., the transformation kernel depth L). Odd values of L are selected to make the kernel symmetrical with respect to a beam array position. The larger the value of L the larger the area covered by the kernel, which should lead to a better interference suppression. On the other hand, a larger L will result in more transformation computations per pixel. A good way to make an initial guess about the kernel depth is to look at the composite image of the training picture (a point target in the middle of the image field) and see how deep the interference pattern is. Then run a few experiments with a smaller and a larger L and find the largest value beyond which no significant improvement in picture quality is observed. Using this approach we found that for a 10-beam system with 1 degree beam separation a satisfactory depth of the transformation kernel is about 13.5 mm, which corresponds to L=11 for an arc separation of 1.23 mm. Obviously, L will depend on many factors, including the number of beams, beam separation, etc.

The target distribution used in the simulations comprises a single target of unit brightness, located at the center of the imaging field, on the line at 0 degrees and the arc at 100 mm.

For the target distribution the results of a 5-beam system (in FIG. 5) and a 10-beam system (in FIG. 6) simulation are shown, each compared to the result of a single-beam system simulation.

Figure 5:
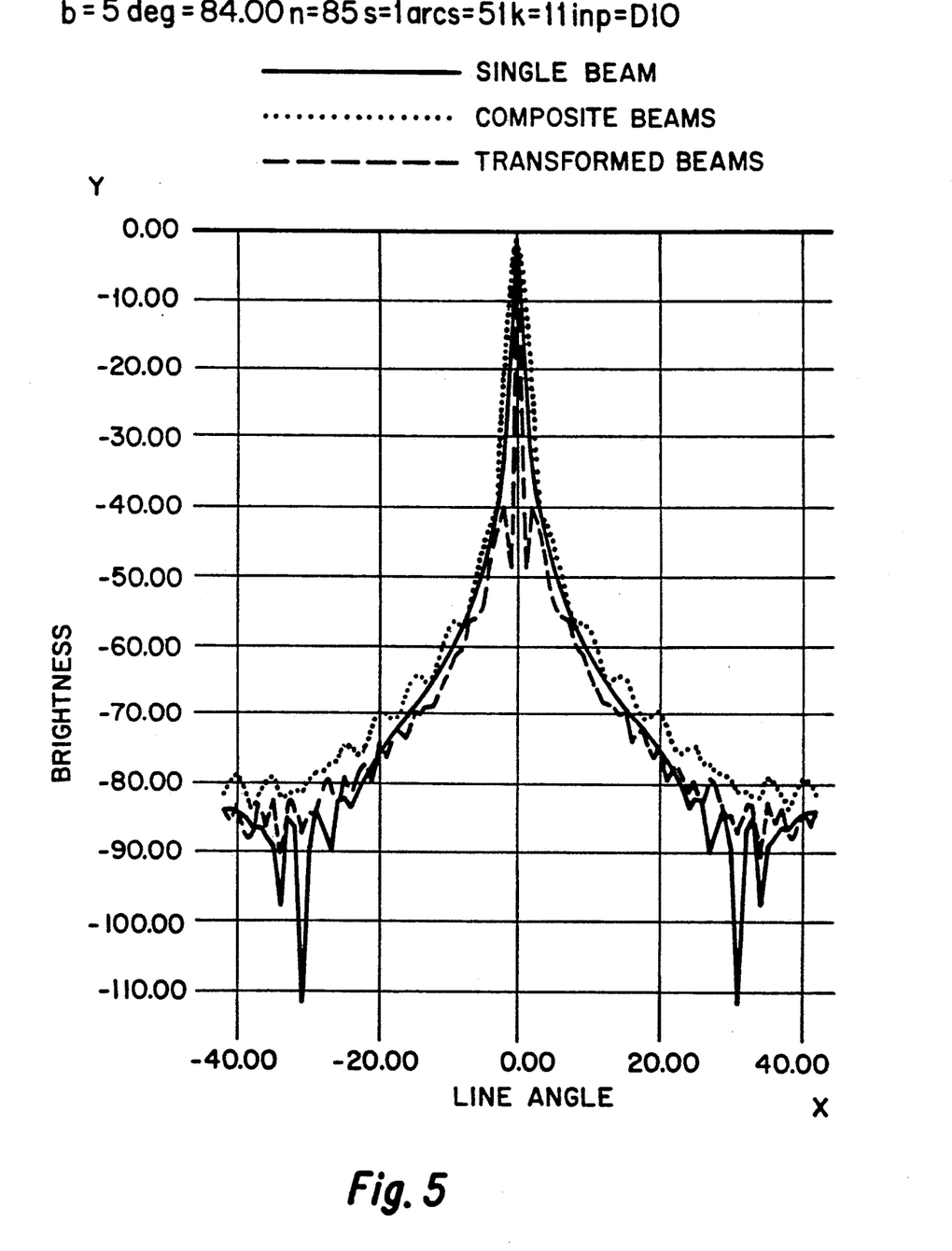
FIG. 5 is a plot of brightness versus line angle for an ultrasound 5-beam scan transformed in accordance with the present invention and being superimposed over the untransformed scan and a single-beam scan.
Figure 6:
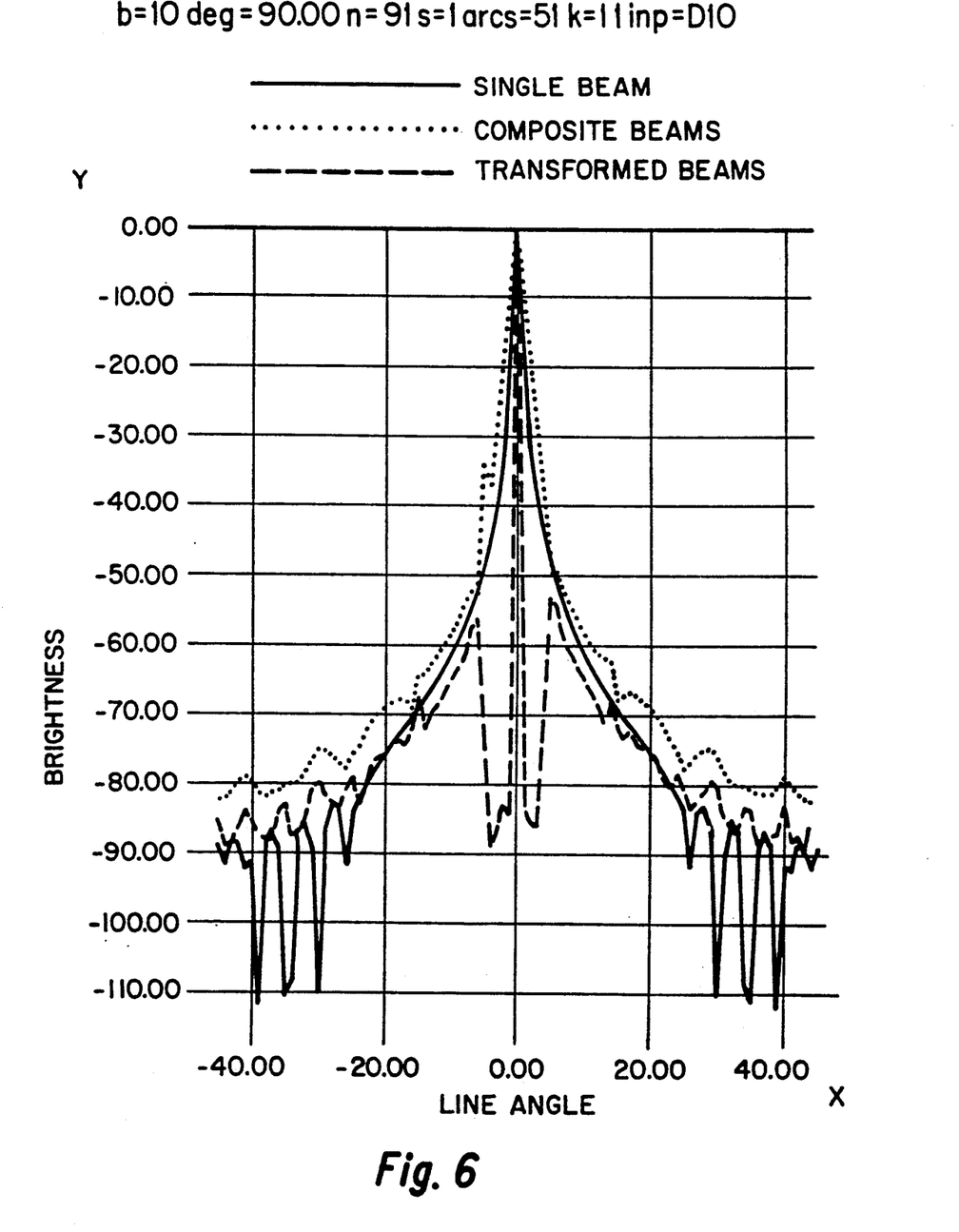
FIG. 6 is a plot similar to FIG. 5 using a 10-beam scan.

FIGS. 5 and 6 each show beam plot simulations of the above-described training-object (a point target) with the vertical axis comprising the maximum brightness (in dB) along each line plotted against the angle of the line relative to the transducer array. Each plot shows the simulated images produced by a single-beam system, a 5-beam system without transformation (referred to as a composite system) and a 5-beam system with transformation. An ideal response in both FIGS. 5 and 6 would comprise a plot with no signal at all angles except zero degrees at which angle a single impulse of zero dB would appear. As can be seen, the plot of the beams transformed in accordance with the present invention provides the most accurate result.

It should be noted that the plots of FIGS. 5 and 6 assume no phase aberrations. In a human body, which includes various types of tissue, each of which transmits ultrasonic pulses at different velocities, the received signals are slightly shifted relative to one another due to the difference in pulse travel time from signal to signal. When random phase aberrations are included as part of the simulated system, the quality of the 5-beam transformed image appears to be slightly superior to that of the 10-beam transformed image and both at some line angles are inferior to the single-beam images. This indicates an expected trade-off between image quality and data acquisition rate.

The beam plots of FIGS. 5 and 6 also indicate that while beam transformation is very good at removing interference and improving resolution close to targets, it also produces sharp side lobes at moderate distance from the targets. This ringing effect is due in part to the use of an ideal delta function as the desired signal in the optimization procedure for transformation coefficients. An improvement in the ringing effect can be expected if a smoother function is used as the desired signal. A natural candidate for the desired signal is a signal resembling the one produced by a single-beam system.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method for imaging an object using an array of ultrasonic transmitters comprising the steps of:
    (a) causing the array to simultaneously transmit a plurality of ultrasonic beams into the object along a plurality of lines and across a plurality of arcs;
    (b) sensing the reflection of all of said beams along one of said lines;
    (c) performing step (b) on each of the other lines;
    (d) creating an image array comprising said reflected signals wherein each value in said array represents a signal reflected from one of said arcs along one of said lines;
    (e) creating a transformed image value for a selected value in said array which is a function of values in reflected signals on both sides of the arc containing the selected array value and which reduces the information in the selected value resulting from reflections of beams transmitted along lines other than the one containing the selected value.

2. The method of claim 1 wherein said method further comprises the step of performing step (e) on a plurality of array values thereby creating an array of transformed image values.

3. The method of claim 1 wherein said function is a linear combination of said values in such reflected signals.

4. A method for imaging an object using an array of ultrasonic transmitters comprising the steps of:
    (a) causing the array to simultaneously transmit a plurality of ultrasonic beams into the object along a plurality of lines and across a plurality of arcs;
    (b) sensing the reflected ultrasonic signal along each of said lines;
    (c) creating an image array comprising said reflected signals wherein each value in said array represents a signal reflected from one of said arcs;
    (d) creating a transformed image value for a selected value in said array which is a function of values in reflected signals on both sides of the arc containing the selected array value, said step of creating a transformed image value further comprising the steps of:

causing the array to simultaneously transmit a plurality of ultrasonic beams into a known training-object along a plurality of lines and across a plurality of arcs;

sensing the reflected ultrasonic signal along the axis of each of the beams;

creating an array comprising said reflected training-object signals wherein each value in said training-object array represents a signal reflected from one of said arcs;

defining a function of the signals in the training-object array which substantially equals the signals in an ideal training-object array; and applying the function so created to the signals in the image array.

5. The method of claim 1 wherein said method further includes the step of sampling each reflected signal thereby creating an image matrix of sampled values taken from the intersection of each line and arc; and wherein the step of creating a transformed image value comprises the step of creating a transformed image value for a selected element in the image matrix which is a function of values in lines on both sides of the arc containing the selected element.

6. A method for imaging an object using an array of ultrasonic transmitters comprising the steps of:
(a) causing the array to simultaneously transmit a plurality of ultrasonic beams into the object along a plurality of lines and across a plurality of arcs;
(b) sensing the reflected ultrasonic signal along each of said lines;
(c) creating an image array comprising said reflected signals where each value in said array represents a signal reflected from one of said arcs;
(d) creating a transformed image value for a selected value in said array which is a function of values in reflected signals on both sides of the arc containing the selected array value, said step of creating a transformed image value further comprising the steps of:

causing the array to simultaneously transmit a plurality of ultrasonic beams into a known training-object;

sensing the reflected ultrasonic signal along the axis of each of the beams;

sampling each reflected signal thereby creating a matrix of training-object sampled values;

defining a function of the elements in the training-object array which substantially equals the elements in an ideal training-object matrix; and applying the function so created to the elements in the image matrix.

7. The method of claim 6 wherein the step of defining a function of the elements in the training-object matrix which substantially equals the elements in an ideal training-object matrix comprises the steps of:

defining a window which covers a preselected number of rows and columns in said training-object matrix;

shifting the window relative to the matrix with each window position including a different set of rows and column in said training-object matrix;

creating an equation for each window position comprising the sum of the matrix elements in the window, each multiplied by an unknown coefficient; and solving the equations for the coefficients which minimize the differences between the values of selected training-object matrix elements and the corresponding elements in the ideal training-object matrix.

8. A method for imaging an object using an array of ultrasonic transmitters comprising the steps of:
(a) causing the array to simultaneously transmit a pair of ultrasonic beams into the object along a pair of lines and across a plurality of arcs;
(b) sensing the reflected ultrasonic signal each of said lines;
(c) creating an image array comprising said reflected signals wherein each value in said array represents a signal reflected from one of said arcs;
(d) creating a transformed image value for a selected value in said array which is a function of values in reflected signals on both sides of the arc containing the selected array values.

9. A method for imaging an object using an array of ultrasonic transmitters comprising the steps of:
(a) causing the array to simultaneously transmit a plurality of ultrasonic beams into the object across a plurality of arcs;
(b) sensing the signal reflected along each ultrasonic beam;
(c) rotating the array a preselected amount to a new position;
(d) repeating steps (a) through (c) a preselected number of times;
(e) sampling each reflected signal thereby creating a matrix of sampled values, each of which is represented by the notation $x(m,j,p)$, where m is the beam number along which the reflected signal sensed, j is the arc number at which the signal was sampled and p is the angular position number of the array; and
(f) for each $x(m,j,p)$ creating a transformed value $y(m,j,p)$ in accordance with the following equation:

$$y(m,j,p) = \sum_{l=0}^{L-1} \sum_{b=0}^{M-1} c(m,l,b)x(b,j - L_0 + l,p)$$

for
$m = 0, 1, \ldots, M - 1$;
$j = L_0, L_0 + 1, \ldots, J - L + L_0$; and
$p = 0, 1, \ldots, P - 1$, where
L is a preselected number of matrix rows,
M is the number of beams in the array,
$L_0$ is the largest integer not exceeding L/2, and
$c(m,l,b)$ is a value in a three-dimensional matrix $\{c(m,l,b)\}$ of coefficients.

10. The method of claim 9 wherein said method further includes the step of selecting values in $\{c(m,l,b)\}$ so as to minimize, for a given beam m, any interbeam interference in $y(m,j,p)$ resulting from reflected energy from other beams.

11. The method of claim 10 wherein the step of selecting values in $\{c(m,l,b)\}$ which minimize the effect of interbeam interference in $y(m,j,p)$ comprises the steps of:
(a) causing the array to simultaneously transmit a plurality of ultrasonic beams into a known training-object;

(b) sensing the training-object signal reflected along each ultrasonic beam;
(c) rotating the array a preselected amount to a new position;
(d) repeating steps 11(a) through 11(c) a preselected number of times;
(e) sampling each reflected signal;
(f) placing each sampled value in a matrix thereby creating a matrix of training-object sampled values, each value being represented by the notation $x_T(m,j,p)$, where m is the beam number along which the reflected signal was sensed, j is the arc number at which the signal was sampled and p is the angular position number of the array;
(g) for each $x_T(m,j,p)$ creating a transformed value $y_T(m,j,p)$; and
(h) solving for values of $c(m,l,b)$ which minimize the differences between the values $y_T(m,j,p)$ and values $d(m,j,p)$ in a matrix $\{d(m,j,p)\}$ of desired training object values.

12. The method of claim 11 wherein the step of solving for $c(m,l,b)$ which minimizes the differences between $y_T(m,j,p)$ and a matrix of desired training-object values comprises the step of minimizing a difference between $y_T(m,j,p)$ and $d(m,j,p)$.

13. The method of claim 12 wherein minimizing a difference comprises minimizing an RMS error given by the expression:

$$\sum_{j=L_0}^{J-L+L_0} \sum_{p=0}^{P-1} (y_T(m,j,p) - d(m,j,p))^2$$

for
$m = 0, 1, \ldots, M-1$, and wherein the step of minimizing the RMS error between $y_T(m,j,p)$ and $d(m,j,p)$ comprises the steps of:
differentiating each equation defining the RMS error;
equating each derivative to zero; and
solving for $c(m,l,b)$.

14. A method for imaging an object using an array of ultrasonic transmitters comprising the steps of:
(a) causing the array to simultaneously transmit a plurality of ultrasonic beams into an object across a plurality of arcs;
(b) sensing the signal reflected along each ultrasonic beam;
(c) rotating the array a preselected amount to a new position;
(d) repeating steps (a) through (c) a preselected number of times;
(e) sampling each reflected signal thereby creating a matrix of sampled values; and
(f) for a selected sampled value creating a transformed value which is a function of sampled values in a plurality of arcs on either side of the arc containing the selected sampled value.

15. The method of claim 14 wherein the step of creating a transformed value which is a function of sampled values in a plurality of arcs on either side of the arc containing the selected sampled value further comprises the step of creating such a transformed value using a sampled value sensed at the same time the reflected signal containing he selected sampled value was sensed.

16. The method of claim 15 wherein the step of creating a transformed value is performed for each sampled value in the matrix thereby creating a matrix of transformed image values.

17. The method of claim 15 wherein said transformed value is a linear combination of the sampled values.

18. The method of claim 14 wherein said function is selected to minimize interbeam interference.

* * * * *

UNITED STATES PATENT AND TRADEMARK OFFICE
CERTIFICATE OF CORRECTION

PATENT NO. : 5,105,814

DATED : April 21, 1992

INVENTOR(S) : Alexander I Drukarev et al.

It is certified that error appears in the above-identified patent and that said Letters Patent is hereby corrected as shown below:

Column 3, line 64   "1/2(2K-K-1),"  should read  -- =1/2(2K-K-1)$\pi$ --;

Column 4, line 25   "$T_b^{\ s}(t)$"  should read  -- $T_b^s(t)$ --;

Column 4, line 31   "$R_j^{\ m}(t)$"  should read  -- $R_j^m(t)$ --;

Column 4, line 31   "$T_b^{\ s}$"  should read  -- $T_b^s$ --;

Column 4, line 37   "$R_j^{\ m}(t)$"  should read  --$R_j^m(t)$ --;

Column 4, line 37   "$R_j^{\ m}(t)$"  should read  -- $R_j^s(t)$ --;

Column 7, line 65   "1-th"  should read  -- l-th --;

Column 7, line 66   "+1,p"  should read  -- +l,p --;

Column 7, line 67   "1=0"  should read  -- l=0 --;

Column 7, line 67   "1=0)"  should read  -- l=0) --;

Column 8, line 6   "(m,1,b) x (b,j-$L_0$+1,p)" should read -- (m,l,b) x (b,j-$L_0$+l,p) --;

Column 8, line 35   "1=0---(m,1,b)x(,J-L0+1,p)" should read -- l=0---(m,l,b)x($b_j$-$L_0$+l,p) --;

Colimn 9, line 43   "(m,1,b)$x_T$(b,j-$L_0$+" should read -- (m,l,b)$x_T$(b,,j-$L_0$+lp) --;

Column 9, line 54   " C(m,1,b)"  should read  -- C(m,l,b)--;

Column 9, line 56   "C9m,$1_s$,$b_q$)"  should read  -- C(m,$l_s$,$b_q$) --;

UNITED STATES PATENT AND TRADEMARK OFFICE
CERTIFICATE OF CORRECTION

PATENT NO. : 5,105,814

DATED : April 21, 1992

INVENTOR(S) : Alexander I Drukarev et al.

It is certified that error appears in the above-identified patent and that said Letters Patent is hereby corrected as shown below:

Column 10, line 26 "n=1M+b" should read -- n=1M+b --;

Signed and Sealed this

T nth Day of August, 1993

Attest:

MICHAEL K. KIRK

*Attesting Officer*      *Acting Commissioner of Patents and Trademarks*